No. 676,062. Patented June 11, 1901.
R. BRATKA.
VALVE.
(Application filed Aug. 30, 1900.)
(No Model.) 2 Sheets—Sheet 1.

Witnesses

Inventor
Rudolph Bratka,
By Victor J. Evans
Attorney

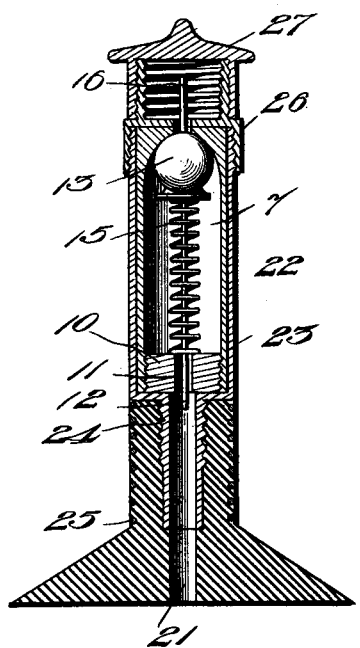
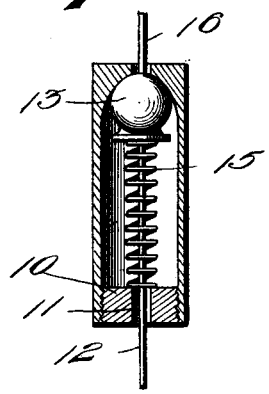

UNITED STATES PATENT OFFICE.

RUDOLPH BRATKA, OF MINNESOTA LAKE, MINNESOTA.

VALVE.

SPECIFICATION forming part of Letters Patent No. 676,062, dated June 11, 1901.

Application filed August 30, 1900. Serial No. 28,528. (No model.)

*To all whom it may concern:*

Be it known that I, RUDOLPH BRATKA, a citizen of the United States, residing at Minnesota Lake, in the county of Faribault and State of Minnesota, have invented certain new and useful Improvements in Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to valves for inflating pneumatic tires, and has for its object to provide an efficient means for permitting the introduction of air into the tire and also to provide against its escape.

With this object in view my invention consists of certain novel parts and combinations of parts, all of which will be fully described hereinafter, recited in the claim, and illustrated in the accompanying drawings, in which—

Figure 1:
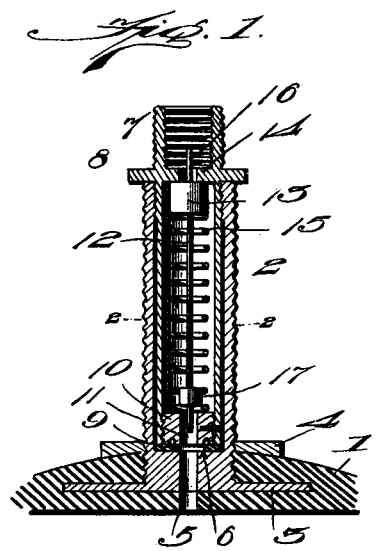
Figure 2:
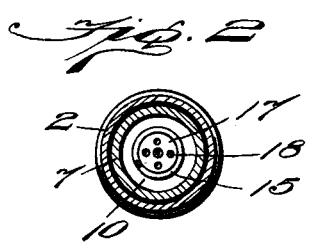
Figure 3:
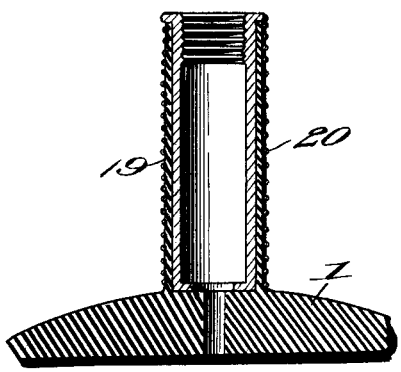

Figure 1 represents a vertical longitudinal sectional view of a portion of a tire and a valve constructed in accordance with my invention. Fig. 2 represents a transverse section on the line 2 2 of Fig. 1. Fig. 3 is a vertical longitudinal sectional view of a modified form of valve-stem. Fig. 4 is a similar view of a modified form of valve and casing, and Fig. 5 is a like view of the valve detached.

Referring now to the drawings by reference-numerals, 1 designates a disk to be cemented to the tire, and 2 the valve shell or tube. This shell or tube is cylindrical in form and is secured to the tire by inserting the annular flange 3 on the base thereof in a suitable opening in the tire and then screwing down the nut 4 on the threaded exterior of said shell.

5 designates the reduced portion of the stem surrounded by the shoulder 6.

Within the tube or shell I arrange the valve-casing 7, comprising an internally and externally threaded tube having a polygonal head or flange 8 intermediate its ends, so that the same can be screwed down into the tube 2. The interior thread in the portion above the flange 8 is for the reception of the nozzle of the pump, while the exterior thread is devised to receive the cap when the valve is not being operated. The lower portion of the casing 7 rests upon a packing-ring 9, interposed between it and the shoulder 6, so that an air-tight joint will be made.

The block 10, screwed to the inner lower end of the casing 7, is provided with a central perforation 11, registering with the reduced opening in the tube, and a transverse groove is also provided in the lower face of this block to admit a screw-driver to facilitate its removal.

The valve-stem 12 is positioned within the case 7 and carries a valve 13, normally pressed against the under side of the inwardly-projecting flange 14 by a coil-spring 15; but this valve can readily be unseated by pressing upon the extended end 16 of the rod 12.

In order to limit the downward movement of the valve 13, I provide a stop 17 near the lower end of the tube and adjacent to the block 10. This stop is provided with a series of perforations 18, so that air may be forced into the tire even when the stop is seated upon the block 10.

As illustrated by reference to Fig. 3, the valve-tube may be fastened in an integral rubber tube 19, projecting from the tire, if found desirable. A wire wrapping 20 will be utilized to retain the tube in place.

In the form shown in Figs. 4 and 5 an extension is shown cast upon the tire and surrounding the inlet-opening 21. The valve-tube 22 comprises a cylindrical or tubular body 23, having a reduced extension 24 to enter the extension of the tire, a wrapping 25 of wire serving to retain said tube in place. The valve-casing is slid within the tube and retained therein by an open cap 26, which can be closed by the exterior cap 27. In this construction the stop is dispensed with and the form of valve is changed from a cylindrical to a spherical valve.

From the foregoing the operation will be obvious, and I would reserve the right to make such changes and alterations as would properly come within the scope of my invention without departing from the spirit thereof.

I claim—

In a device of the character described, the combination with a hollow tube, of a removable casing therein having an inlet and an outlet opening, of a spring-pressed valve within the casing, a depending valve-rod secured to the valve and a stop on the lower end of said rod to limit the movement of the valve.

In testimony whereof I affix my signature in presence of two witnesses.

RUDOLPH BRATKA.

Witnesses:
 A. O. OLESON,
 WM. A. QUINN.